United States Patent [19]

Stretch et al.

[11] Patent Number: 5,234,377
[45] Date of Patent: Aug. 10, 1993

[54] COMPOSITE SPRING WITH IMPROVED ENDS

[75] Inventors: Dale A. Stretch, Novi, Mich.; Edward J. Hummelt, Wawautosa, Wis.

[73] Assignee: Eaton Corporation, Cleveland, Ohio

[21] Appl. No.: 960,228

[22] Filed: Oct. 13, 1992

Related U.S. Application Data

[63] Continuation of Ser. No. 560,408, Jul. 30, 1990, abandoned.

[51] Int. Cl.$^5$ .............................................. F16D 3/68
[52] U.S. Cl. ...................................... 464/77; 464/87; 464/903; 192/106.1
[58] Field of Search .................... 464/51, 77, 87, 903; 192/106.1

[56] References Cited

U.S. PATENT DOCUMENTS

| | | |
|---|---|---|
| 620,916 | 3/1899 | Hafner . |
| 1,085,731 | 2/1914 | Hafner . |
| 1,684,773 | 9/1928 | Marks ................................ 464/91 |
| 1,751,228 | 3/1930 | Bethel . |
| 1,997,021 | 4/1935 | Spase ................................ 464/77 |
| 3,236,066 | 2/1966 | Webb . |
| 3,362,512 | 1/1968 | Ericson ................................ 192/68 |
| 3,984,998 | 10/1976 | Rogakosetal . |
| 4,210,234 | 7/1980 | Jones ................................ 192/106.1 |
| 4,613,030 | 9/1986 | Maycock et al. ................. 464/77 X |
| 4,690,256 | 9/1987 | Bopp et al. ........................ 192/21 |
| 4,790,793 | 12/1988 | Bocardit ............................ 464/77 |
| 4,874,074 | 10/1989 | Damon et al. .................... 192/106.2 |
| 4,914,799 | 4/1990 | Kyle .................................. 29/429 |

FOREIGN PATENT DOCUMENTS 2611013  2/1987  France .

*Primary Examiner*—Daniel P. Stodola
*Assistant Examiner*—William G. Battista, Jr.
*Attorney, Agent, or Firm*—P. S. Rulon

[57] ABSTRACT

A torsional vibration damping mechanism (30) in a free standing clutch plate (26) for a vehicle driveline. The mechanism (30) includes composite C-shaped springs (41,42) for attenuating driveline torsionals and transmitting driveline torque, and a viscous damper (48) for controlling the rate of flexing of the springs. The mechanism also includes input and output drives (46,44) for flexing the springs only radially inward. The C-shaped composite springs are formed by removing a center portion of a minor arc of a closed ring comprising a plurality of layers of reinforcing filaments, or by cutting a composite cylinder into closed rings and removing the center portion. The composite springs include expanded end portions (41a,41b,42a,42b or 106b) to facilitate attachment of end brackets (72) to the springs without need of fasteners penetrating the composite.

6 Claims, 4 Drawing Sheets

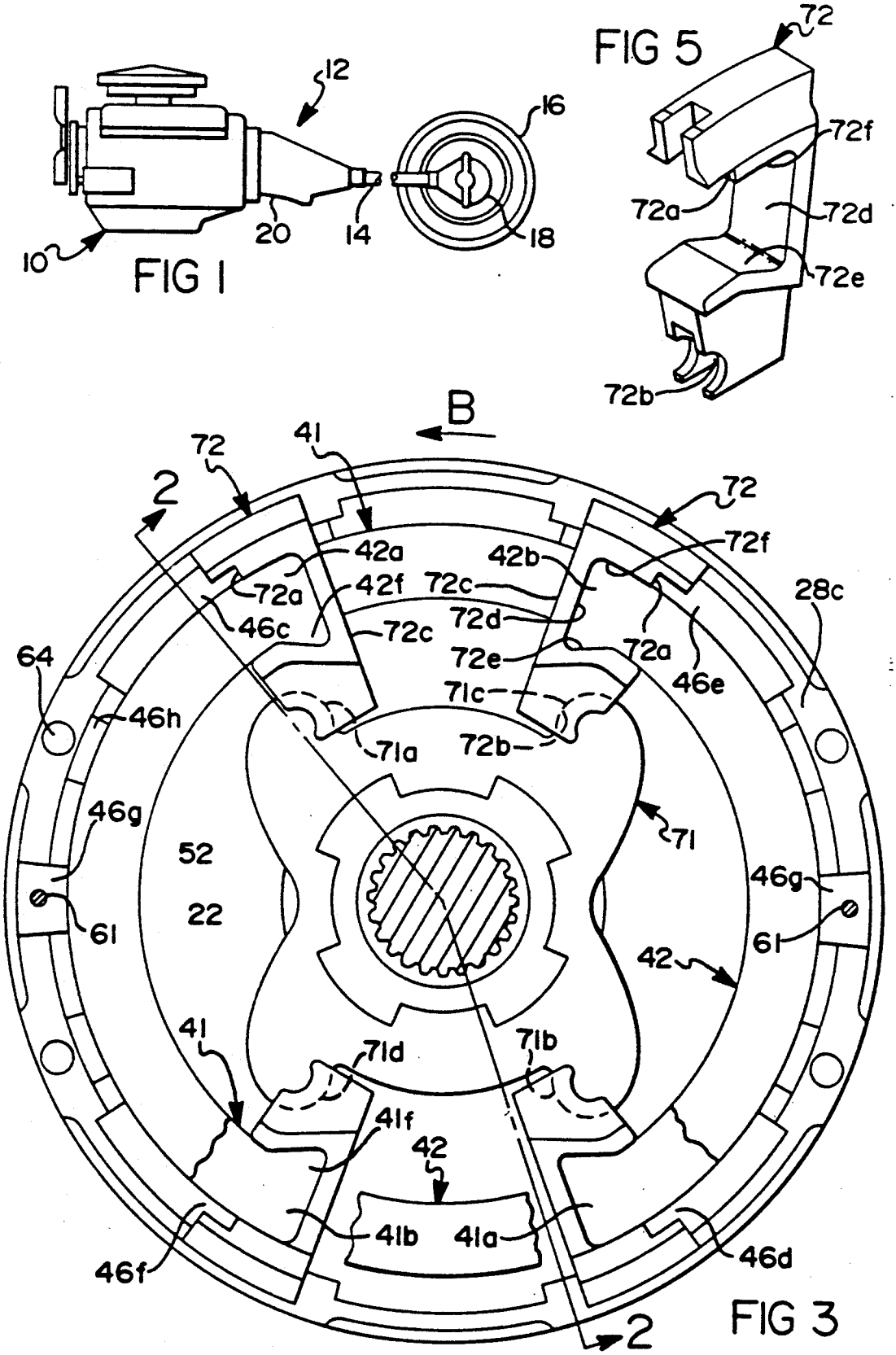

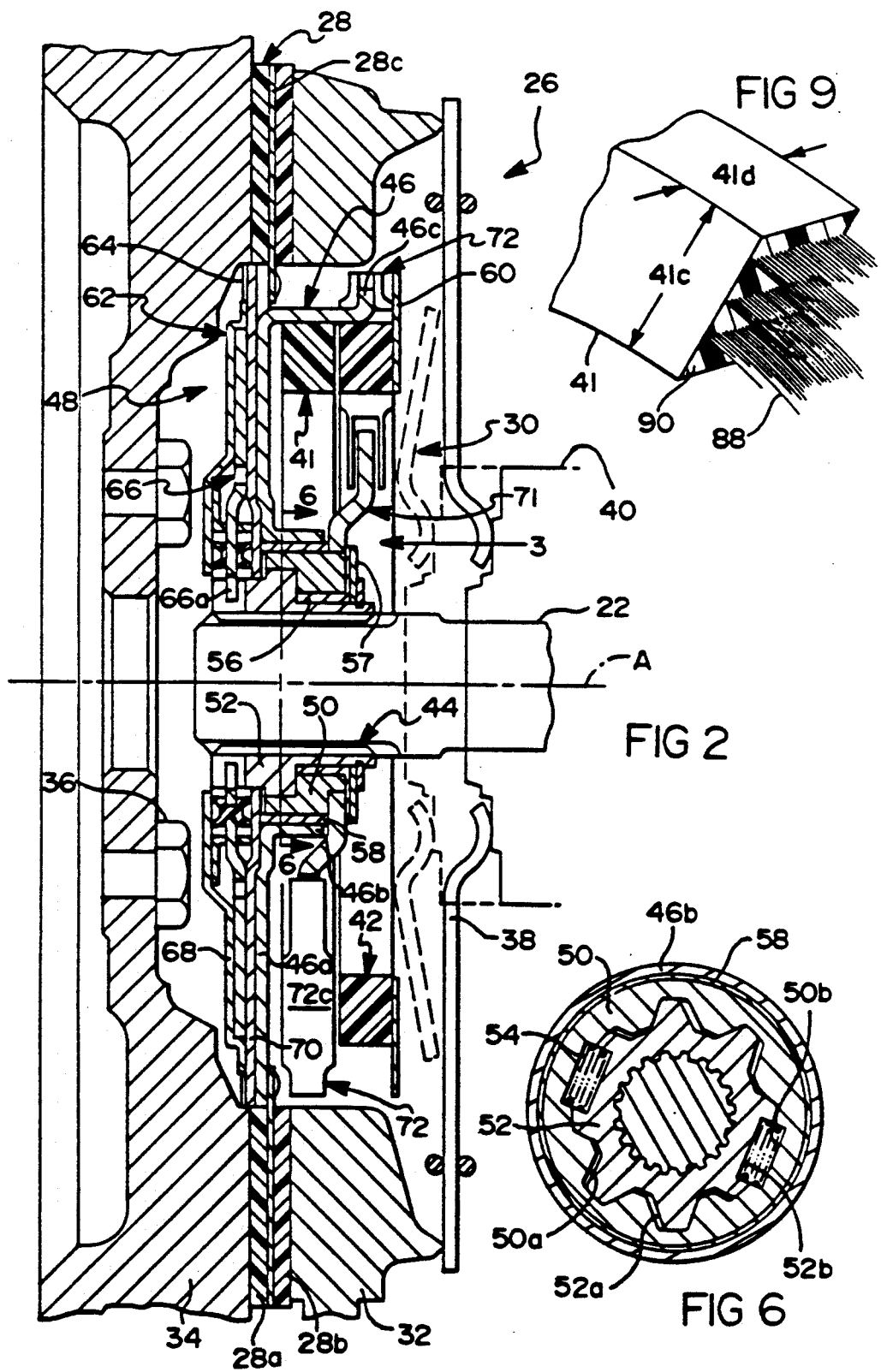

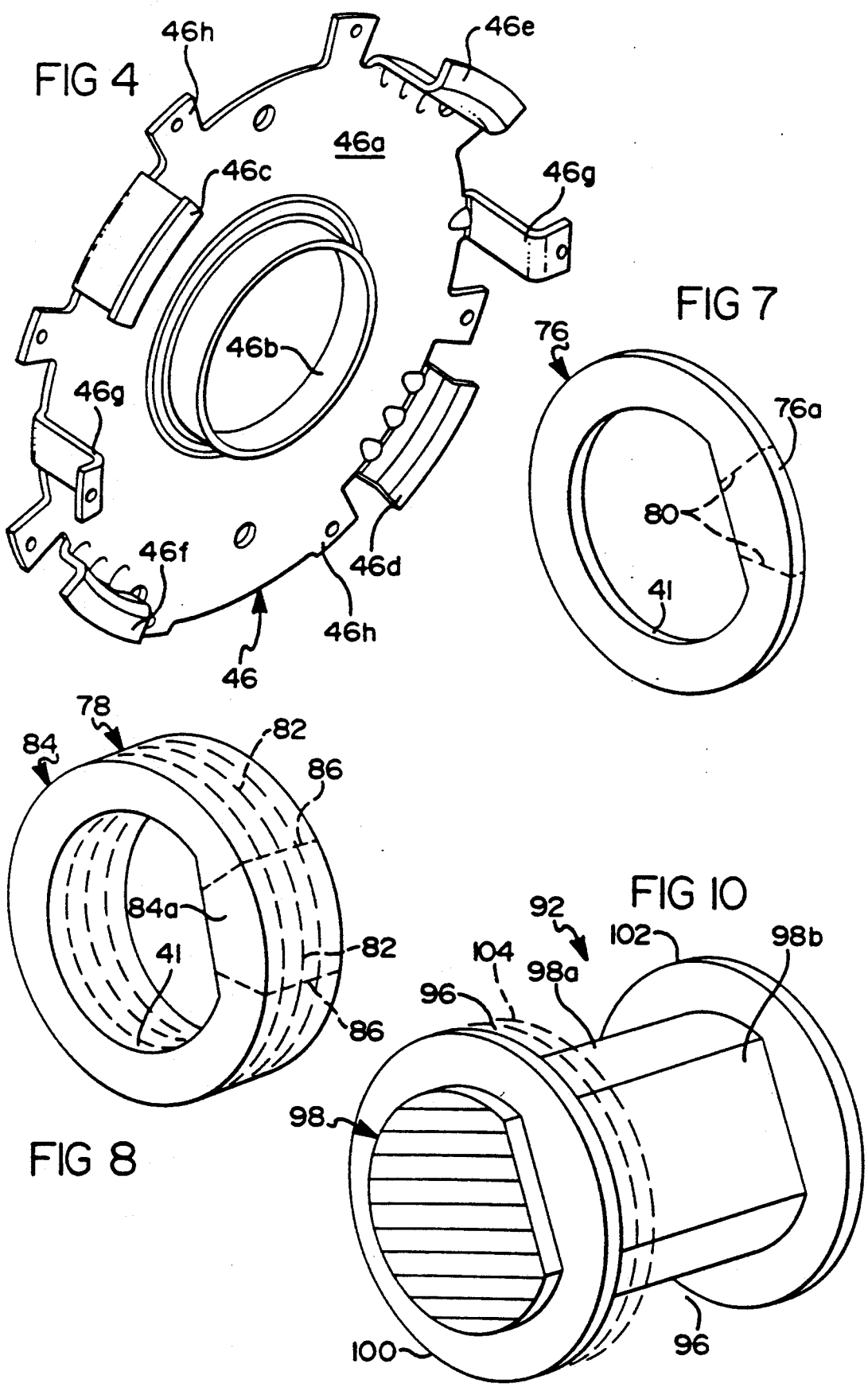

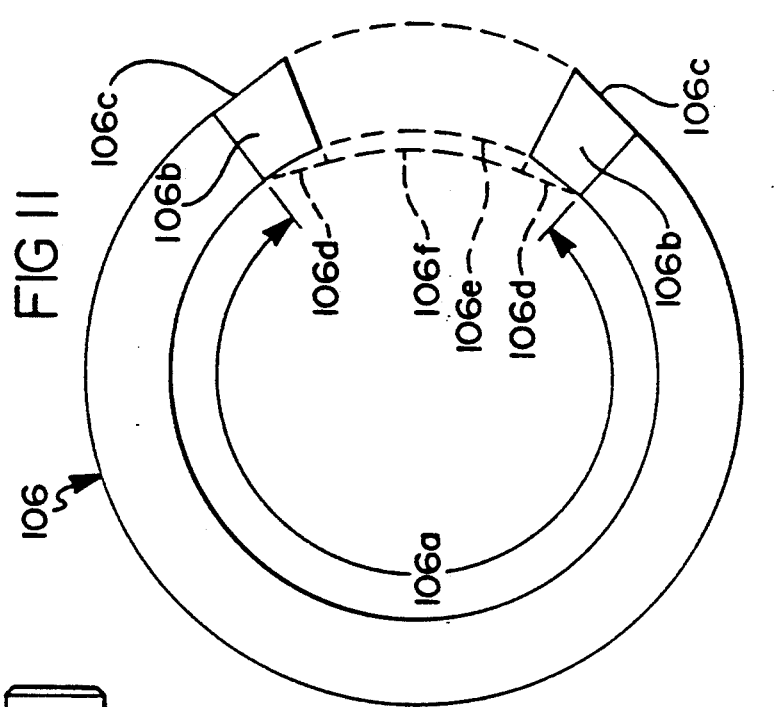
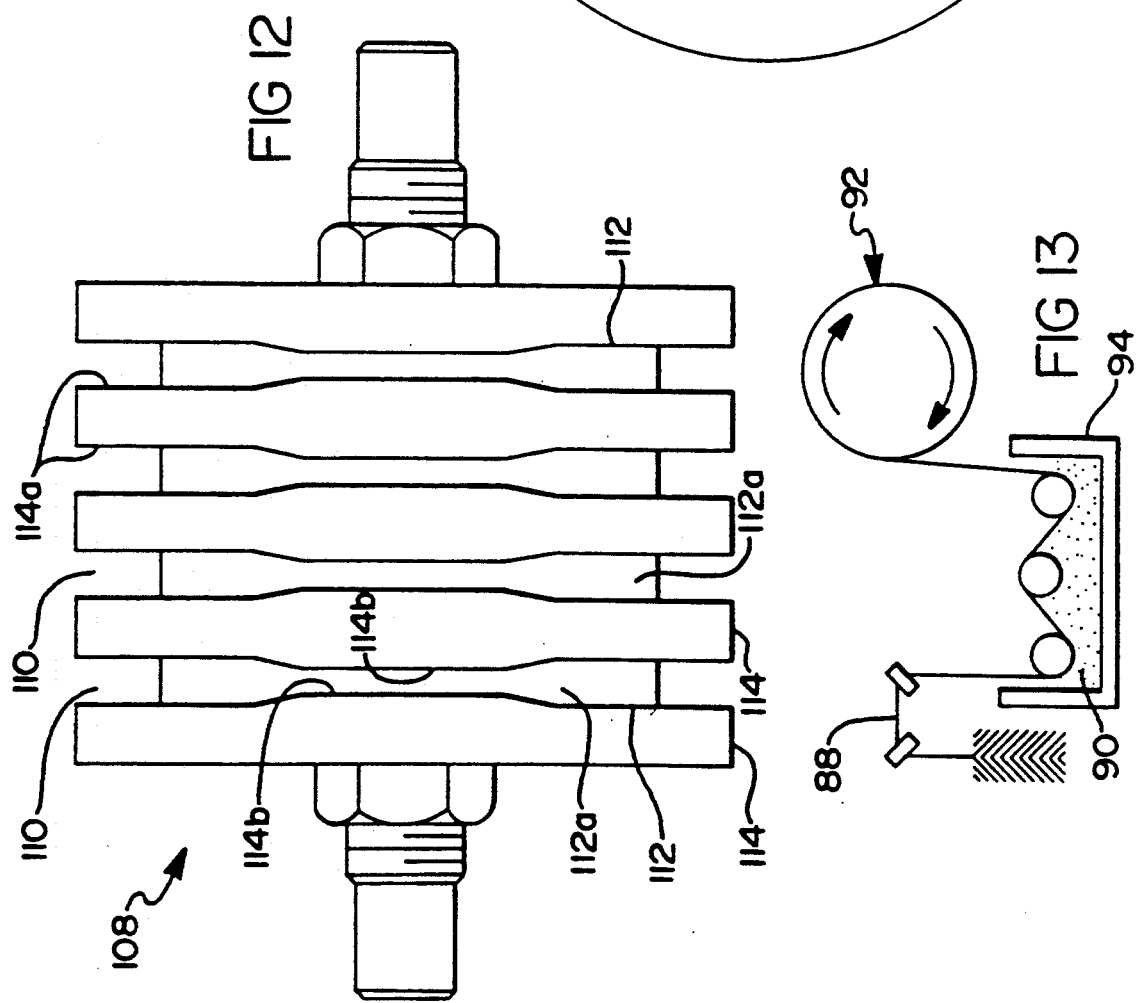

COMPOSITE SPRING WITH IMPROVED ENDS

This application is a continuation of application Ser. No. 560,408, filed Jul. 30, 1990 now abandoned.

CROSS REFERENCE

This application relates to U.S. patent application Ser. No. 07/560,407 filed Jul. 30, 1990, now allowed continuation-in-part application Ser. No. 814,312, filed Dec. 23, 1991, and assigned to the assignee of this application.

FIELD OF THE INVENTION

This invention relates to a composite spring for a torsional vibration damper mechanism. More specifically, the invention relates to forming and attaching composite springs ends.

BACKGROUND OF THE INVENTION

Torsional vibration damping mechanisms have long been used to reduce the adverse effects of torsional vibrations or fluctuating torques in vehicle drivelines. Such torsional vibrations or fluctuating torques, hereinafter referred to as torsionals, emanate primarily from engine power pulses and torque spikes, and from abrupt changes in driveline torque due primarily to rapid engine acceleration/deceleration and transmission ratio changes.

Such mechanisms commonly employ a spring(s) to attenuate torsionals and transmit positive and negative torque between the vehicle engine and wheels, and employ a damper assembly to control the rate of flexing of the springs. Examples of such mechanisms may be seen by reference to U.S. Pat. Nos. 4,874,074 and 4,690,256; and French patent application 2,611,013. These documents are incorporated herein by reference.

The mechanisms in the U.S. documents each employ a nested pair of spiral wound springs formed of steel; these springs are designed to withstand flexing of forty or more degrees, flex radially inward and outward in response to increasing positive and negative torque, and are symmetrically balanced when paired.

The mechanism in the French Patent document employs a single spiral wound spring formed of a composite material including a plurality of layers of reinforcing filaments bonded together by a plastic material; this spring has an unknown flex design limit, flex radially inward and outward in response to increasing positive and negative torque, and is not per se symmetrically balanced.

The steel spiral wound springs in the mechanism of the U.S. patent documents have the disadvantage of increasing the inertia of the damping mechanism. The composite spring in the mechanism of the French patent document has the disadvantage of being per se symmetrically unbalanced, is difficult to install in a damper mechanism for flexing in only one direction, and is prone to delamination failure of the reinforcing filaments due to flexing in both directions.

Several problems have been encountered concerning attachment of composite spring ends and, particularly, problems encountered in the attachment of composite spring ends in the limited available space of a vehicle driveline torsional damping mechanism. In some applications manufacturing costs are increased when holes have to be drilled in the spring ends to effect end attachment by fasteners such as screws or bolts. Such drilling may also weaken the spring ends and reduce the life of the spring. Also, as in the above mentioned French patent document, a substantial portion of the length of the composite spring is devoted to end attachment, thereby reducing the effective or active length of the spring and reducing the space available for the active portion of the spring.

SUMMARY OF THE INVENTION

An object of this invention is to provide a composite spring with improved ends.

Another object of this invention is to provide a mechanism for forming a composite spring with improved ends.

Another object of this invention is to provide a method of forming a composite spring with improved ends.

According to a feature of this invention, a torque transmitting spring is formed of a plurality of reinforcing filaments bonded together by a plastic material. The spring has a radius of curvature for disposing the spring radially outward of and concentric to an axis. The spring has first and second end portions for transmitting torque between input and output drives. A portion of the spring adjacent each end portion has predetermined radial and axial cross-sectional dimensions with respect to the axis.

The improvement is characterized by at least one of the end portions having an increased cross-sectional dimension in at least one of the radial and axial directions.

BRIEF DESCRIPTION OF THE DRAWINGS

The torsional vibration damping mechanism of the present invention is shown in the accompanying drawings in which:

FIG. 1 is a schematic view of a motor vehicle driveline,

FIG. 2 is a detailed, sectional view of the torsional vibration damping mechanism looking along line 2—2 of FIG. 3;

FIG. 3 is a detailed relief view of a portion of the mechanism looking in the direction of arrow 3 of FIG. 2;

FIGS. 4 and 5 are perspective views of parts in the mechanism;

FIG. 6 is a sectional view of a hub assembly looking along line 6—6 of FIG. 2.

FIGS. 7 and 8 are respectively perspective views of a ring and a cylinder of composite material prior to being made into C-shaped springs;

FIG. 9 is an enlarged schematic view of a portion of one of the C-shaped springs illustrating layers of reinforcing filaments protruding from a matrix of plastic material;

FIG. 10 schematically illustrates a partial view of a mandrel mechanism for forming the springs of FIGS. 8 and 9;

FIG. 11 illustrates an alternative configuration of the C-shaped composite spring;

FIG. 12 illustrates a mandrel mechanism for forming the spring of FIG. 11; and

FIGS. 13 schematically illustrates a system for coating reinforcing filaments with a liquid plastic material and winding the coated filaments on the mandrel mechanism of FIGS. 10 or 12.

DETAILED DESCRIPTION OF THE DRAWINGS

The motor vehicle driveline seen schematically in FIG. 1 includes a prime mover 10 and a transmission 12 having an output shaft 14 drivingly connected to a load such as ground engaging wheels 16 via a differential gear assembly 18 for rear and/or front axles of a vehicle. Prime mover 10 is preferably of the internal, periodic combustion type but may be any type of power plant having torque characteristics that are improved by a torsional vibrational damping mechanism. The transmission includes a housing 20 containing a plurality of unshown, constant mesh ratio gears or ratio change mechanism driven by a transmission input shaft or drive 22 partially shown in FIG. 2. Well-known ratio change devices or clutches within the transmission are employed to selectively (i.e., manually or automatically) put the transmission into a neutral position wherein the input shaft is not connected to the load or into in-gear positions wherein the input shaft is connected to a load such as wheels 16.

Looking now at FIGS. 2–6 and primarily at FIGS. 2 and 3, therein is illustrated a master clutch plate assembly 26 disposed for rotation about the axis A of shaft 22 and in one direction indicated by arrow B in FIG. 3 and taken as the direction of positive torque. The clutch plate assembly includes an annular friction ring 28 in driving relation with shaft 22 via a torsional vibration damping mechanism 30 positioned radially between the friction ring and shaft 22. The friction ring includes oppositely facing friction surfaces 28a,28b frictionally connected to an unshown engine output shaft in response to selective axial movement of a pressure plate 32 toward a flywheel 34 secured to an engine output shaft in known manner by partially shown bolts 36. The pressure plate is resiliently pushed into engagement by a diaphragm spring 38 when a schematically illustrated throw-out bearing 40 is in the solid line position and is disengaged when the throw-out bearing is in the phantom line position.

The torsional vibration damping mechanism 30 includes a pair of C-shaped springs 41,42 for attenuating torsionals and transmitting driveline torque, a hub assembly 44, a support member 46, and a viscous damper assembly 48. Damper assemblies other than the viscous shear type disclosed herein may be employed, e.g., the vane damper of previously mentioned U.S. Pat. No. 4,690,256 may be employed.

The hub assembly 44, is similar to the hub assembly in previously mentioned U.S. Pat. No. 4,874,074. The assembly includes outer and inner hub members 50,52 and, as seen in FIG. 6, two idle rattle springs 54. The hub members and springs collectively define a hub idle rattle assembly. Outer member 50 has a somewhat Z-shaped cross-section with an inner cylindrical surface journaled on an outer cylindrical surface of inner hub member 52 via a cylindrical portion of a bearing 56. Relative axially movement of the hub members is prevented by a thrust washer 57 sandwiched between a radially extending portion of bearing 56 and a snap ring secured in a groove of hub member 50. Inner hub member 52 is slidably splined to shaft 22. The idle rattle portion of the assembly has a plurality of internal spline teeth 50a and two diametrically oppositely disposed recesses 50b defined by hub 50, an equal number of external spline teeth 52a loosely received in teeth 50a and two diametrically oppositely disposed recesses 52b registering with recesses 50b, and the springs 54 for opposing the free play between teeth 50a,52a. Springs 54 are designed to provide a force sufficient to resiliently interconnect the hub members when the transmission is in a neutral position, i.e., when shaft 22 is not connected to a load. Hence, springs 54 are of a relatively low rate or stiffness compared to springs 41,42 which are designed to resiliently transmit substantially maximum normal driveline torque. Hub assembly 44 further includes a plate member 71 affixed to and extending radially outward from outer hub member 50. The plate includes first and second pairs of output drive lugs 71a,71b and 71c,71d which react with springs 41,42.

Support member 46, as best seen in FIG. 4, includes a radially extending flange portion 46a having an inner sleeve portion 46b journaled via a sleeve bearing 58 on an outer cylindrical surface of outer hub member 50, first and second pairs of input drive lugs 46c,46d and 46e,46f for reacting with springs 41,42 and defined on the free ends of portions extending axially in cantilever fashion from flange portion 46a, a pair of axially extending brackets 46g for securing a flat ring 60 thereto via fastener 61 shown in cross-section in FIG. 3, and six radially extending tabs 46h for securing an inner periphery of a flange 28c of the friction ring and an outer periphery of an annular housing assembly 62 of the viscous damper by fasteners 64. Flat ring 60 prevents rightward axial movement of the adjacent C-shaped spring 42. Ring 60 and washer 57 are removed in FIG. 3 to show details of the underlying structure.

Viscous damper assembly 48 includes the annular housing assembly 62 and an annular clutch assembly or viscous shear plate assemblies 66. The damper assembly is preferably of the type disclosed in U.S. Pat. No. 4,914,799 which is incorporated herein by reference. Briefly, the damper housing assembly includes axially spaced apart sidewalls 68,70 defining a chamber filled with a viscous liquid. The clutch or shear plate assembly 66 includes a radially inner portion 66a splined to inner hub member 50 and a radially outer portion having oppositely facing clutching surfaces in close axially spaced relation with surfaces defined by sidewalls 68,70. The housing and clutch surfaces are disposed for clutching coaction therebetween via the viscous shear liquid in response to relative rotation of the housing and clutch assembly. Such relative rotation, of course, occurs in response to flexing of springs 41,42,54 and therefore relative rotation of the damping mechanism input and output defined by support member 46 and hub assembly 44.

C-shaped springs 41,42 each include a first end portion 41a,42a and a second end portion 41b,42b. In FIG. 3, spring 42 is partially broken away on either side of the six o'clock position to show the first and second ends 41a,41b of spring 41. A major arc portion of each spring has radial and axial dimensions represented by 41c,41d in FIG. 9. These dimensions within the major arc portion may vary to vary spring stiffness and stress distribution. The end portions of each spring 41,42 include surface portions 41f,42f skewed with respect to adjacent surface portions of the major arc portion, i.e., the direction of the surface portions 41f,42f deviate from the curved inner cylindrical surface of the major arc portion of the springs. This skewing increases the radial cross-sectional dimension of the end portions and provides the end portions with a wedge like axial profile for readily attaching brackets 72 to the end portions without need of fasteners penetrating the composite. The brackets with respect to their installed positions each include a radially outwardly extending contact 72a and a radially inwardly extending contact 72b. The radially outer contacts 72a of the brackets affixed to the first and second ends of spring 42 are embraced by circumferentially spaced apart lugs 46c,46e of the first and second pairs of input drive lugs, and in the same manner the contacts 72a of the brackets affixed to the first and second ends of spring 41 are embraced by circumferentially spaced apart lugs 46d,46f of the first and second pairs of input drive lungs. Each bracket also includes a radially extending stop surface 72c. When the brackets are installed, the stop surfaces limit the number of rotational degrees each spring can flex, herein the stop surfaces are forty degrees apart. Further with respect to attachment of brackets 72 to the spring ends and with respect to the installed position of the brackets on the springs in the damping mechanism, each bracket includes a recess having a radially extending surfaces 72d and circumferentially inner and outer surfaces 72e,72f which snugly embrace the spring end. Each recess includes axially opening sides for inserting the spring ends into the recesses. The contacting surface of the spring ends and recesses may be bonded together by an adhesive in known manner.

The radially inner contacts 72b of the brackets affixed to the first and second ends of spring 42 are embraced by circumferentially spaced apart lugs 71a,71c of the first and second pairs of output drive lugs, and in the same manner the radially inner contacts 72b of the brackets affixed to the first and second ends of spring 41 are embraced by circumferentially spaced apart lugs 71b,71d of the first and second pairs of output drive lugs. Lugs 71a,71c and 71b,71d are axially offset so as to be aligned with the axial center of springs they are in driving relation with.

C-shaped springs 41,42 are preferably formed from individual rings 76, as is illustrated in FIG. 7 or, alternatively, from a cylinder 78 as is illustrated in FIG. 8. Ring 76 is formed to the desired axial and radial thickness, and then made into a C-shaped spring 41 or 42 by cutting along phantom lines 80 to remove a center portion 76a of the minor arc portion continuing the end portions. Cylinder 78 is formed to the desired radial thickness, then cut along phantom lines 82 into rings 84 of desired axial thickness and then made into a C-shaped spring 41,42 by cutting along phantom lines 86 to remove a center portion 84a.

FIG. 9 schematically illustrates an enlarged portion of one of the C-shaped composite springs with pluralities layers of continuous strands of reinforcing filaments or fibers 88 protruding from a matrix of plastic material 90. The filaments extend in the direction of curvature of the rings or cylinders. The filaments and layers of filaments are substantially closer together than illustrated and comprise more than 50% of the volume of the composite material. The filaments and the plastic may be any of several known materials. For example, the filaments may be formed of carbon, glass, aramids, boron, nylon, etc. The plastic may be formed of epoxides, cyante esters, bismaleimides, thermoset polyimides, thermoplastic polyimides, etc. Good results have been obtained with glass fibers bonded together by an epoxy resin marketed by Shell Oil Company as Shell 9405.

Rings 76 and/or cylinders 78 may be formed by layup of layers of reinforcing strands of filaments or fibers coated with a liquid plastic material. However, the rings and/or cylinders are preferably formed by winding continuous strands or layers of filaments or fibers, such as glass fibers, in annular grooves on a rotating mandrel mechanism 92, such as is schematically illustrated in FIG. 10. FIG. 13 schematically illustrates a process for feeding the continuous strands 88 to the rotating mandrel mechanism 92 via a tank 94 containing the plastic material in liquid form.

Herein, the individual rings 76 or cylinders 78 are formed in radially outwardly open, annular grooves 96 on the mandrel mechanism 92 mounted for rotation in unshown manner. The grooves are defined at their radially or circumferentially inner extent by a shaft like member 98 having a cylindrical surface portion 98a of major arc length (i.e., an arc greater than 180 degrees) and a flat or chordal surface portion 98b extending between a minor arc length. To form a cylinder 78, the axial length of the grooves are defined by radially extending, axially spaced apart surfaces of sidewall members 100,102, which are removably affixed to shaft 98 in any of several known ways. To form individual rings 76 additional sidewall members 104, shown in phantom lines, are affixed to the shaft to provide the desired axial length of the grooves.

Looking now at FIG. 11, therein is shown another embodiment of a C-shaped composite spring 106 having a major arc portion 106a substantially the same as the major arc portion of springs 41,42 end portions 106b which have radially outwardly skewed surfaces 106c and/or radially inwardly skewed surfaces 106d. Spring 106 is formed in a mandrel mechanism 108 shown in FIG. 12. Mechanism 108 includes a plurality of radially outwardly opening, annular grooves 110 defined at their radially or circumferentially inner extent by spacer members 112 sandwiched between radially extending sidewall members 114. The spacers and sidewall members have surfaces 112a,114a for defining the major arc portion of spring 106,106a and a minor arc portion having sidewall surface portions 114b skewed axially inward with respect to the adjacent sidewall surfaces 114a for forming skewed end surfaces 106c of the spring end portions and/or the skewed end surfaces 106d. The skewed end surfaces 106d are not formed when the radius of curvature of the major and minor arc portions of the outer surface 112a of spacer 112 is the same. Phantom line 106e illustrates a minor arc portion radius of curvature which is the same as for the major arc portion. End surfaces 106d are provided by undercutting the surface 112a within the minor arc portion, e.g., by increasing the radius of curvature as illustrated by phantom line 106f. During wind up of the continuous strands in the grooves, the minor arc portion of the composite be formed will have the increased radial cross-sectional dimension, as with spring 76,78, but due to the restricted axial space therein or due to the restricted axial space and varying the radius of curvature of spacer surface 112a. Hence, when a center portion of the formed composite is removed, the resulting end portions 106a will have increased radial cross-sectional dimensions which include surface 106e and/or 106d.

A preferred embodiment of the invention has been disposed for illustrative purposes. Many variations and modifications of the preferred embodiment are believed to be within the spirit of the invention. The following claims are intended to cover the inventive portion of the preferred embodiment and variations and modifications within the spirit of the invention.

What is claimed is:

1. A torque transmitting spring comprising:
   first and second ends;
   an arc portion between said ends and having a radius of curvature, for disposing the spring radially outward of and substantially concentric to an axis, the arc portion having first and second arc portion ends with predetermined radial and axial cross-sectional dimensions with respect to the axis;
   first and second end portions each having a length respectively extending circumferentially from the arc portion ends to the first and second ends;
   the arc portion and the end portions integrally formed together by a plurality of reinforcing filaments bonded together by a plastic material;
   the first and second end portions each adapted to be affixed to a bracket for transmitting torque to and from the spring in directions wherein increasing torque only tends to decrease the radius of curvature of the arc portion; and
   the first and second end portions each having a radial and an axial cross-sectional dimension with at least one of said end portion dimensions being substantially the same as a corresponding dimension of the arc portion ends of a position contiguous thereto, and at least one of said end portion dimensions progressively increasing to a maximum along the length of each first and second end portion in directions toward the first and second ends, respectively, for providing each end portion with a wedge-like profile for retaining the bracket thereon.

2. The spring of claim 1, wherein the increasing cross-sectional dimension of the end portions is in the radial direction.

3. The spring of claim 2, wherein the end portions have a reduced cross-sectional dimension in the axial direction.

4. The spring of claim 1, wherein the spring is C-shaped and the first and second ends of the end portions are circumferentially aligned and spaced apart.

5. The spring of claim 4, wherein the increasing cross-sectional dimension of the end portions is in the radial direction.

6. The spring of claim 5, wherein the end portions have a reduced cross-sectional dimensional in the axial direction.

* * * * *